Oct. 31, 1961 R. C. M. SMITH ET AL 3,006,260
PRODUCTION OF PHOTOGRAPHIC COLOUR RECORDS
Filed Aug. 4, 1958
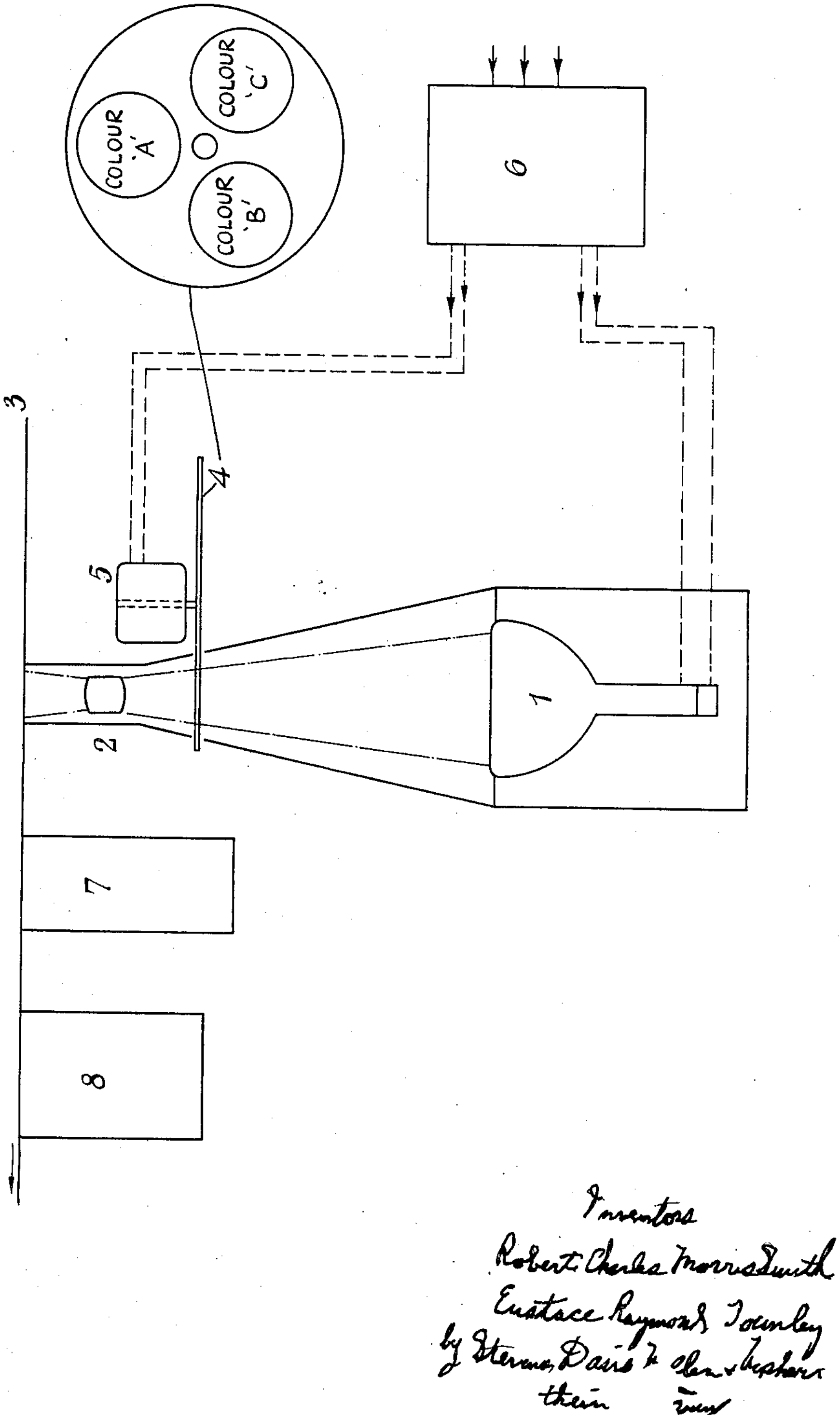
Inventors
Robert Charles Morris Smith
Eustace Raymond Townley
by Stevens, Davis, Miller & Mosher
their attys United States Patent Office
3,006,260
Patented Oct. 31, 1961

3,006,260
PRODUCTION OF PHOTOGRAPHIC COLOUR RECORDS

Robert Charles Morris Smith, Ilford, England, and Eustace Raymond Townley, Hillington, Glasgow, Scotland, assignors to Ilford Limited, Ilford, England, a British company Filed Aug. 4, 1958, Ser. No. 752,928
Claims priority, application Great Britain Aug. 9, 1957
2 Claims. (Cl. 95—12)

This invention relates to photographic colour processes and is particularly concerned with apparatus adapted to photograph, process and project three-colour pictures from the processed material within a short time interval.

The invention has special reference to apparatus adapted to photograph a cathode ray tube trace and to give a fully processed picture within a short time interval.

In co-pending applications Nos. 642,697, now Patent No. 2,927,790, and 642,698, there is described apparatus of the type herein referred to adapted to give a high quality black and white projected picture within a very short time interval.

In this apparatus, a trace on a cathode ray tube is photographed on photographic light sensitive film which remains stationary in a camera at an exposure station for a predetermined time interval. It is then passed from the camera to a processing station where again it remains for the same time whilst a new picture is taken at the exposure station. From the processing station, the film passes to a projection station where an image thereof is projected upon a screen. In apparatus of this kind the operation at the processing station is so timed that processing will be complete by the time the photographic film is moved to the projection station. The picture projected on the screen, in this case, displays the cathode ray tube traces as white images on a black background or, alternatively, as black images on a white background.

In certain cases it may be desired to distinguish between signals displayed in succession on a cathode ray tube face.

It is the object of this invention to provide apparatus of the type herein referred to in which a multicolour picture is obtained, each colour representing a different type of signal.

In accordance with this invention, there is provided apparatus for photographing, processing and projecting pre-selected signals or groups of signals appearing in succession as traces on a cathode ray tube face, which comprises a cathode ray tube, a camera for photographing traces on the phosphor face of said tube on to photographic light-sensitive film held stationary for a predetermined time interval in said camera, a processing unit for said film and a projection unit for said processed film, means for causing the film to traverse stepwise from said camera through said processing unit and said projection unit, a filter unit having a plurality of filter elements of different colour transmission characteristics, the said different colours being included in the response of the phosphor of the cathode ray tube, means for bringing said filter elements severally into the path of light from said cathode ray tube to said camera, and means responsive to electrical signals or groups of signals which are of intrinsically different character or which are electrically pre-coded to differentiate them to feed one signal or one selected group of signals at a time to the cathode ray tube so that it or they are displayed as traces on the face of said tube, and simultaneously to motivate the said filter unit to bring into active position a filter element pre-selected for the particular signal or group of signals being so displayed, the said signals or groups of signals being thus displayed and the filter unit motivated in succession in respect of each signal or group of signals of the different classes received by said means, the said film being coated with two or more selectively colour-sensitive silver halide emulsion layers which may be processed to yield different colour images and the processing unit being adapted to process said film to yield said colour images.

In one form of the invention, colour coupling compounds are incorporated in the coating emulsions and in an alternative form the color coupling compounds are added at the development stage.

This invention will now be described, by way of example, in use in apparatus designed to produce a projected three-colour picture of the images appearing on a cathode ray tube face, each of the three colours corresponding to one of three different signals or groups of signals appearing as images on that face. The apparatus employed is schematically illustrated in the accompanying drawing. Referring to the drawing, a cathode ray tube 1 is provided, the face of which is coated with a white phosphor or a mixture of phosphors to produce a given number of colours separable by filtration. Signals received by this cathode ray tube are thus displayed as light images on this face. This light is arranged to pass through a camera lens 2 on to a bipack film 3 held flat in a gate. This bipack film may, for example, be a photographic film base coated with two photographic light sensitive emulsions superimposed one on the other. It may be arranged that the upper light sensitive emulsion is only blue-sensitive and that the lower emulsion has a green sensitiser added. In such a case, the two emulsions will be separated by a blue absorbing interlayer, e.g. a yellow filter layer.

The film 3 is caused to travel, as indicated by the arrow, through a processing unit 7 and a projector 8. Located between the face of the cathode ray tube 1 and the lens 2 is a light filter unit 4 which can be caused to rotate by a motor 5 to bring any one of the filter areas *a*, *b* and *c*, as shown, into the path of light between the face of the cathode ray tube 1 and the camera lens 2.

The motor 5 is caused to take up positions bringing the filter elements into active position by means of a computer device 6. There are fed to the computer device electrical signals which either fall into intrinsically different classes or which have been pre-coded so that they may be differentiated.

In this particular example it is assumed that there are three such classes but, with an appropriate increase in the number of filter elements and appropriate differentially light-sensitive layers in the colour film, larger numbers of signal classes can be similarly dealt with.

The computer device, operating in manner known per se, initially feeds to the cathode ray tube a signal or group of signals which is of one of the classes and simultaneously motivates the filter unit 4 to bring into the path between the cathode ray tube and the camera lens 2 a filter element particularly selected for that signal or group of signals. After a time interval the computer feeds the second class of signal to the cathode ray tube and simultaneously motivates the filter unit to bring into position a filter element preselected for such second class of signal. The operation is repeated for the third class of signal and the sequence then repeated to constitute a continuous cycle of operations.

As already indicated, where the original signals to be differentiated in colour according to this invention are of the same general character, but originate from sources which are to be distinguished, it is necessary to distinguish the signals by a pre-selected coding. Thus one or more electrical coding quantities may be associated with each signal or group of signals to identify its or their character and the information thus provided fed to and stored by electronic or electromagnetic means in the computer, the computer responding to the coding quantities to feed to the cathode ray tube during each successive unit element of time only signals of one particular coded group. The device 6 thus constitutes a trigger unit which is responsive to the coded signals thus received, and in any manner well known per se energises the motor 5 to bring into position a particular filter element corresponding to the nature of the coded signal to which it is reacting.

In the case where it is desired to record (using a film as described above) three types of signals all appearing as light traces of the same colour on the cathode ray tube face, it may be arranged that when the first type of signal appears a green filter is switched into position in the path of the light travelling from the cathode ray tube to the film, when the second type of signal appears the green filter is removed and a blue filter is switched into position, and when the third type of signal appears no filters at all are used or, if desired, a neutral filter is used. In this way the first type of signal is recorded in the lower sensitive layer of the bipack film, the second type in the upper layer and the third type in both layers.

The processing unit may be, for example, of the type described in co-pending application No. 642,697.

In application No. 642,698 there is described a jet processing system which is suitable for processing the film used in this invention. If desired a four jet system may be used, the four jets supplying developing, bleaching, fixing and washing solutions.

The manner of processing will of course depend on the character of the photographic film used. It may be of any type in which the selectively sensitive layers may be processed selectively to yield different colour images. However, in practice it is generally found desirable to employ film in which the emulsion layers contain colour coupling compounds, preferably substantive to the layers, which on development with an aromatic primary amino developing agent will yield azomethine or indophenol dyes in situ with the developed image. It will, of course, be appreciated that the colour coupler need not be one which yields a dye of the colour of the filter used to record the relative signal since only a differentiation in colour is required.

In using such material the processing sequence may be as follows, the specific solutions being given by way of example only. The solutions, four in number, are applied by the four jet system referred to above:

*Jet 1.—Developer*

| | |
|---|---|
| Hexamethylene phosphate (the commercial product Calgon) in 20% solution ______ mls.. | 15 |
| Trisodium phosphate (cryst.) ______ g.. | 80 |
| Sodium sulphite (10% anhydrous in aqueous solution) ______ mls.. | 50 |
| Potassium bromide (10% aqueous solution) ___ mls.. | 10 |
| Diethylaminotoluidine ______ g.. | 4 |
| 1-phenyl-3-pyrazolidone (0.625 g.+6 ml. of 10% anhydrous sodium sulphite in water, made up to 100 cc. with water) ______ mls.. | 10 |

Water to make 1 litre.

*Jet 2.—Bleaching solution*

| | G. |
|---|---|
| Potassium dichromate (cryst.) | 10 |
| Sulphuric acid (conc.) | 20 |
| Glacial acetic acid | 50 |

Water to make 1 litre.

*Jet 3.—Fixing solution*

| | G. |
|---|---|
| Ammonium thiocyanate (cryst.) | 350 |
| Dye (soluble Blue N) | 0.0024 |

Water to make 1 litre.

*Jet 4.—Wash solution*

2% aqueous sodium thiosulphate (cryst.)

The aforesaid type of material yields images in colour on a white background. It is possible to obtain the images on a dark background, which is preferred for some purposes, but the number of processing stages must be increased by providing a preliminary development in a non-colour developer and an overall flash exposure before the colour development of Jet 1 above. Alternatively, a dark background product may be obtained by using pre-dyed emulsion layers and working by the silver-dye-bleach process as follows, the specific formulations again being by way of example:

*Jet 1.—Developer*

| | |
|---|---|
| Sodium sulphite (anhydrous) ______ g.. | 79 |
| Potassium bromide ______ g.. | 3.9 |
| Sodium hydroxide ______ g.. | 19.6 |
| Hydroquinone ______ g.. | 31.5 |
| 1-phenyl-3-pyrazolidone ______ g.. | 1.96 |
| 64 O.P. industrial spirit ______ ml.. | 43 |

Water to make 1 litre.

*Jet 2.—Dye bleach*

| | |
|---|---|
| Hydrochloric acid (S.G. 1.16) ______ ml.. | 100 |
| Thiourea ______ g.. | 10 |
| 2:3-dimethyl quinoxaline ______ g.. | 5 |

Water to make 1 litre.

*Jet 3.—Wash*

Water alone is satisfactory.

After processing, the film then passes to a projection station in the usual way.

It is to be appreciated that, in this way, different types of signals all of which appear as light traces of the same colour on the face of the cathode ray tube are colour differentiated in the finished picture, and that there is no necessary relation between the light colour and the dye colour.

If desired the film base may be coated with one emulsion on each side and, by the provision of two separate systems of jets, each side may be processed at the same time.

What we claim is:

1. Apparatus for photographing, processing and projecting preselected signals appearing as traces on a cathode ray tube face, which comprises a cathode ray tube, a camera for photographing traces on the phosphor face of said tube on to photographic light-sensitive film held stationary for a pre-determined time interval in said camera, a processing unit for said film and a projection unit for said processed film, means for causing the film to traverse stepwise from said camera through said processing unit and said projection unit, a filter unit having a plurality of filter elements of different colour transmission characteristics, the said different colours being included in the response of the phosphor of the cathode ray tube, means for bringing said filter elements one at a time into the path of light from said cathode ray tube to said camera, and means responsive to random electrical signals which are of intrinsically different character or which are electrically pre-coded to differentiate them, to feed signals of one character at a time to the cathode ray tube so that they are displayed as traces on the face of said tube, and simultaneously to move the said filter unit to bring into active position a filter element pre-selected for the particular signals being so displayed, the said signals being thus displayed and the filter unit moved in respect of the signals of each different class received by said means, the said film being coated with at least two selectively colour-sensitive silver halide emulsion layers which may be processed to yield different colour images and the processing unit being adapted to process said film to yield said colour images.

2. Apparatus for photographing, processing and projecting pre-selected signals appearing as traces on a cathode ray tube face, which comprises a cathode ray tube, a camera for photographing traces on the phosphor face of said tube on to photographic light-sensitive film held stationary for a pre-determined time interval in said camera, a processing unit for said film and a projection unit for said processed film, means for causing the film to traverse stepwise from said camera through said processing unit and said projection unit, a rotatable filter unit having a plurality of filter elements of different colour transmission characteristics, the said different colours being included in the response of the phosphor of the cathode ray tube, means for rotating said filter unit to bring said filter elements one at a time into the path of light from said cathode ray tube to said camera, and means responsive to random electrical signals which are of intrinsically different character or which are electrically pre-coded to differentiate them, to feed signals of one character at a time to the cathode ray tube so that they are displayed as traces on the face of said tube, and simultaneously to rotate the said filter unit to bring into active position a filter element pre-selected for the particular signals being so displayed, the said signals being thus displayed and the filter unit rotated in respect of the signals of each different class received by said means, the said film being coated with at least two selectively colour-sensitive silver halide emulsion layers which may be processed to yield different colour images and the processing unit being adapted to process said film to yield said colour images.

References Cited in the file of this patent

UNITED STATES PATENTS

| | | |
|---|---|---|
| 2,295,443 | Wilson | Sept. 8, 1942 |
| 2,586,772 | Ashby | Feb. 26, 1952 |
| 2,688,278 | Tuttle | Sept. 7, 1954 |

UNITED STATES PATENT OFFICE
CERTIFICATION OF CORRECTION

Patent No. 3,006,260 October 31, 1961

Robert Charles Morris Smith et al.

It is hereby certified that error appears in the above numbered patent requiring correction and that the said Letters Patent should read as corrected below.

In the grant, lines 3 and 4, for "assignors to Ilford Limited, of Ilford, England, a British company," read -- assignors to Ilford Limited, of Ilford, England, and Kelvin & Hughes Limited, of Hillington, Glasgow, Scotland, both British companies, --; line 13, for "Ilford Limited, its successors" read -- Ilford Limited, and Kelvin & Hughes Limited, their successors --; and in the heading to the printed specification, lines 6 and 7, for "assignors to Ilford Limited, Ilford, England, a British company" read -- assignors to Ilford Limited, Ilford, England, and Kelvin & Hughes Limited, Hillington, Glasgow, Scotland, both British companies --.

Signed and sealed this 19th day of June 1962.

(SEAL)
Attest:

ERNEST W. SWIDER
Attesting Officer

DAVID L. LADD
Commissioner of Patents